United States Patent [19]
Yamaguchi

[11] Patent Number: 5,788,006
[45] Date of Patent: Aug. 4, 1998

[54] HYBRID VEHICLE

[75] Inventor: Kozo Yamaguchi, Aichi-ken, Japan

[73] Assignee: Kabushikikaisha Equos Research, Japan

[21] Appl. No.: 636,702

[22] Filed: Apr. 23, 1996

[30] Foreign Application Priority Data

Apr. 28, 1995 [JP] Japan .................. 7-106513

[51] Int. Cl.$^6$ .................................. B60K 6/04
[52] U.S. Cl. ........................ 180/65.2; 180/65.3
[58] Field of Search ................. 180/65.2, 65.3, 180/65.4, 65.6, 65.8; 310/102 R, 121, 123

[56] References Cited

U.S. PATENT DOCUMENTS

| | | | |
|---|---|---|---|
| 2,571,284 | 10/1951 | Nims | 310/102 R |
| 3,192,421 | 6/1965 | Sayler | 310/102 R |
| 3,566,717 | 3/1971 | Berman et al. | 180/65.2 |
| 4,335,429 | 6/1982 | Kawakatsu | 180/65.4 |
| 4,407,132 | 10/1983 | Kawakatsu et al. | 180/65.4 |
| 4,562,894 | 1/1986 | Yang | 180/68.8 |
| 5,492,189 | 2/1996 | Kriegler et al. | 180/65.6 |

*Primary Examiner*—Brian L. Johnson
*Assistant Examiner*—Frank Vanaman
*Attorney, Agent, or Firm*—Lorusso & Loud

[57] ABSTRACT

A hybrid vehicle which can run under a heavy load without requiring an electric motor large in size or an inverter element of large capacity. The hybrid vehicle includes an internal-combustion engine, an electric machine unit to which the rotation of the internal-combustion engine is input, an electric motor driven by electric current supplied thereto, a differential gear unit including at least three gear elements with a first gear element connected to the electric machine unit, a second gear element connected to an output shaft, and a third gear element connected to the internal-combustion engine, and a stopping device for stopping the rotation of the third gear element. Since the hybrid vehicle can be driven by the driving force of the electric machine unit, the driving force and torque constant of the electric motor can be reduced to that required of the electric machine unit so that the electric motor need not be large in size.

20 Claims, 8 Drawing Sheets

5,788,006

HYBRID VEHICLE

BACKGROUND OF THE INVENTION

1. FIELD OF THE INVENTION

The present invention relates to a hybrid vehicle.

2. DESCRIPTION OF RELATED ART

Conventionally, in a series type of hybrid vehicle, a generator is driven by the rotation generated by an internal-combustion engine, the electric current obtained from the generator is converted into a direct current, which is sent to and stored in a battery, and the electric power of the battery is further converted into alternating current to drive an electric motor. In a parallel type of hybrid vehicle in which the internal-combustion engine is connected to the electric motor through a clutch, when the hybrid vehicle is started, the hybrid vehicle is driven by the electric motor, with the clutch engaged, and by the internal-combustion engine, and when the hybrid vehicle rapidly accelerates, the electric motor is driven. A hybrid vehicle combining the series type of hybrid vehicle with the parallel type of hybrid vehicle has also been provided.

The hybrid vehicles with the internal-combustion engine connected to the electric motor can be driven in an engine driving mode in which only the internal-combustion engine is driven, in a motor driving mode in which only the electric motor is driven, and in an engine-motor driving mode in which both an internal-combustion engine and an electric motor are driven.

In another hybrid vehicle the internal-combustion engine is connected to the generator and part of the output force from the internal-combustion engine is transmitted to the generator with the rest of the output force being directly transmitted to the output shaft. In this latter type hybrid vehicle, the internal-combustion engine can be driven in a highly efficient region and all the energy of the internal-combustion engine need not be used in generating electricity, as in a series type of hybrid vehicle, so that the fuel consumption can be reduced. Further, the internal-combustion engine can be driven in a comparatively stable state, so that the amount of exhaust gas can be reduced.

However, when the conventional hybrid vehicles are started in a motor driving mode, for example, they require generation of a large amount of torque by the electric motor in a region in which there is a heavy load on the electric motor (hereinafter referred to as "heavy load region"), so that an electric motor of a large size is needed since the torque constant must be sufficiently high to supply the amount of torque required. Further, in order to generate a large amount of motor torque, a correspondingly large electric current must be supplied to the electric motor, so that an inverter element of large capacity is needed.

An object of the present invention is to eliminate the above-described disadvantages of the conventional hybrid vehicles and to provide a hybrid vehicle which can run under a heavy load without requiring either an electric motor large in size or an inverter element of large capacity.

SUMMARY OF THE INVENTION

In order to attain the above-described object, the hybrid vehicle of the present invention includes an internal-combustion engine, a generator/motor for generating electric power from the input rotation, an electric motor driven by an electric current supply, an output shaft connected to the internal-combustion engine and the electric motor, a differential gear unit consisting of at least three gear elements with a first gear element connected to the generator, a second gear element connected to the output shaft and a third gear element connected to the engine, and stopping means for stopping the rotation of the third gear element, so that the output torque from the generator/motor is transmitted to the output shaft as a result of the operation of the stopping means functioning as a reaction force element, when the generator/motor is operated as a motor.

The hybrid vehicle may also include a vehicle speed detecting means for detecting vehicle speed, and the internal-combustion engine is stopped and the generator is driven when the vehicle speed detected by the vehicle speed detecting means is lower than a set value.

The hybrid vehicle may further include load detecting means for detecting the running load required of the vehicle, and the internal-combustion engine is stopped and the generator is driven when the load detected by the load detecting means is larger than a set value and at the same time the vehicle speed detected by the vehicle speed detecting means is lower than a set value.

The detected running load may be that on the electric motor.

The above-mentioned required running load may be detected as a degree of accelerator opening.

The stopping means may be a one-way clutch. The one-way clutch becomes free when the internal-combustion engine rotates in a normal direction, and locks when the internal-combustion engine is about to rotate in a reverse direction.

A clutch may be provided between the internal-combustion engine and the stopping means and the stopping means may include a friction element.

In another embodiment the present invention includes an internal-combustion engine, an electric motor driven by an electric current supply, an output shaft connected to the electric motor, a generator including an armature and a rotor, both of which are rotatable, with one of the armature and the rotor connected to the output shaft and the other of the armature and the rotor connected to the internal-combustion engine, and stopping means provided between the internal-combustion engine and the generator/motor for stopping the rotation of a shaft connected to the engine when the generator/motor operates as a motor to transmit its rotation to the output shaft.

Another embodiment of the hybrid vehicle of the present invention includes an internal-combustion engine, a generator/motor for generating electric power responsive to an input rotation, an electric motor driven by an electric current supplied thereto, an output shaft connected to the internal-combustion engine, the generator/motor and the electric motor, and stopping means for stopping the rotation of the engine when the generator/motor operates as a motor and at the same time the electric motor is driven.

DETAILED DESCRIPTION OF THE PREFERRED EMBODIMENT(S)

Figure 1:
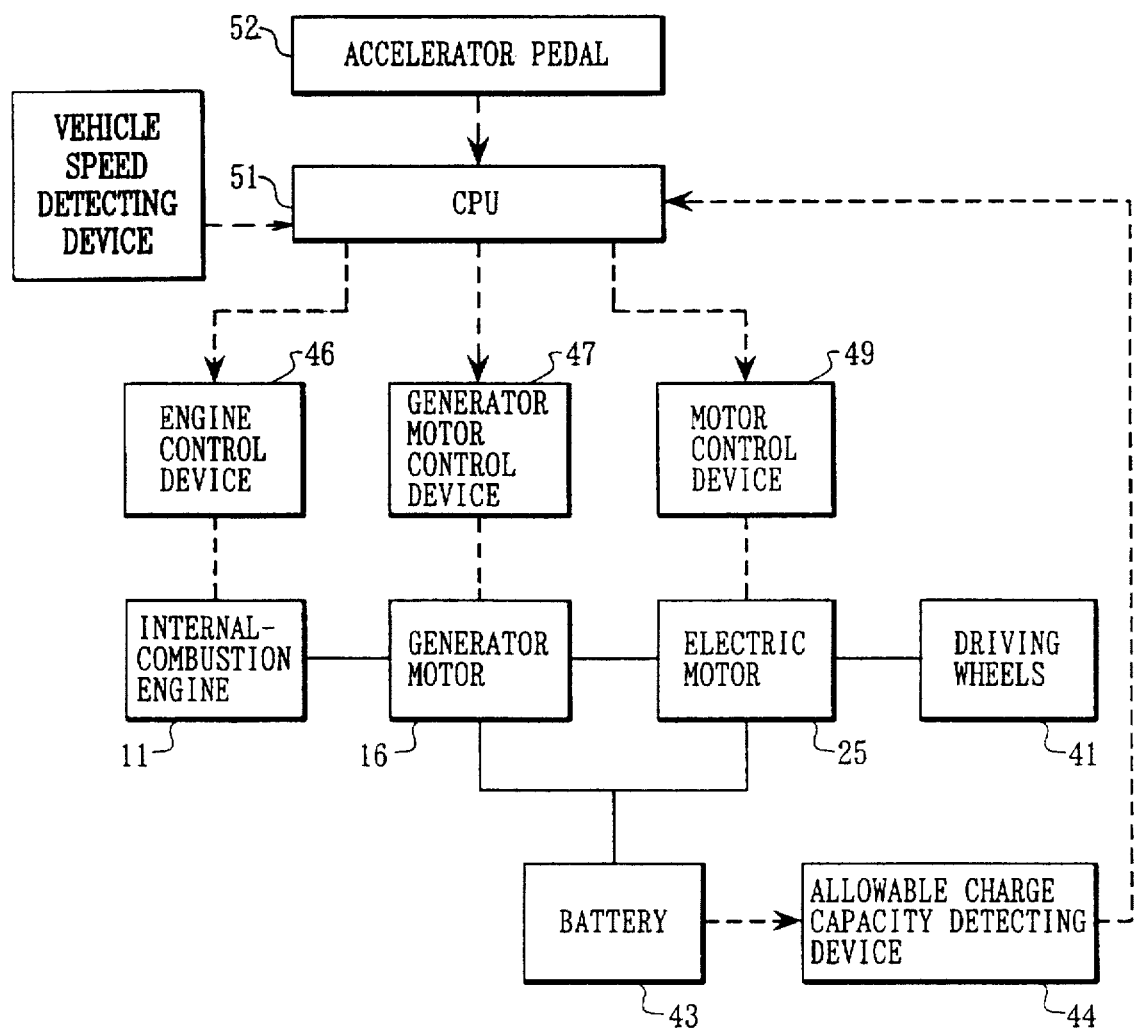
FIG. 1 is a block diagram of the drive system and its control in the hybrid vehicle of a first embodiment of the present invention.

Certain terminology will be used in the following description for convenience in reference only and is not intended to be limiting. The words "up", "down", "right" and "left" will designate directions in the drawings to which reference is made. The words "in" and "out" will refer to directions toward and away from, respectively, the geometric center of the device and designated parts thereof. Such terminology will include derivatives and words of similar import.

Preferred embodiments of the present invention will be now described with reference to the drawings.

Figure 2:
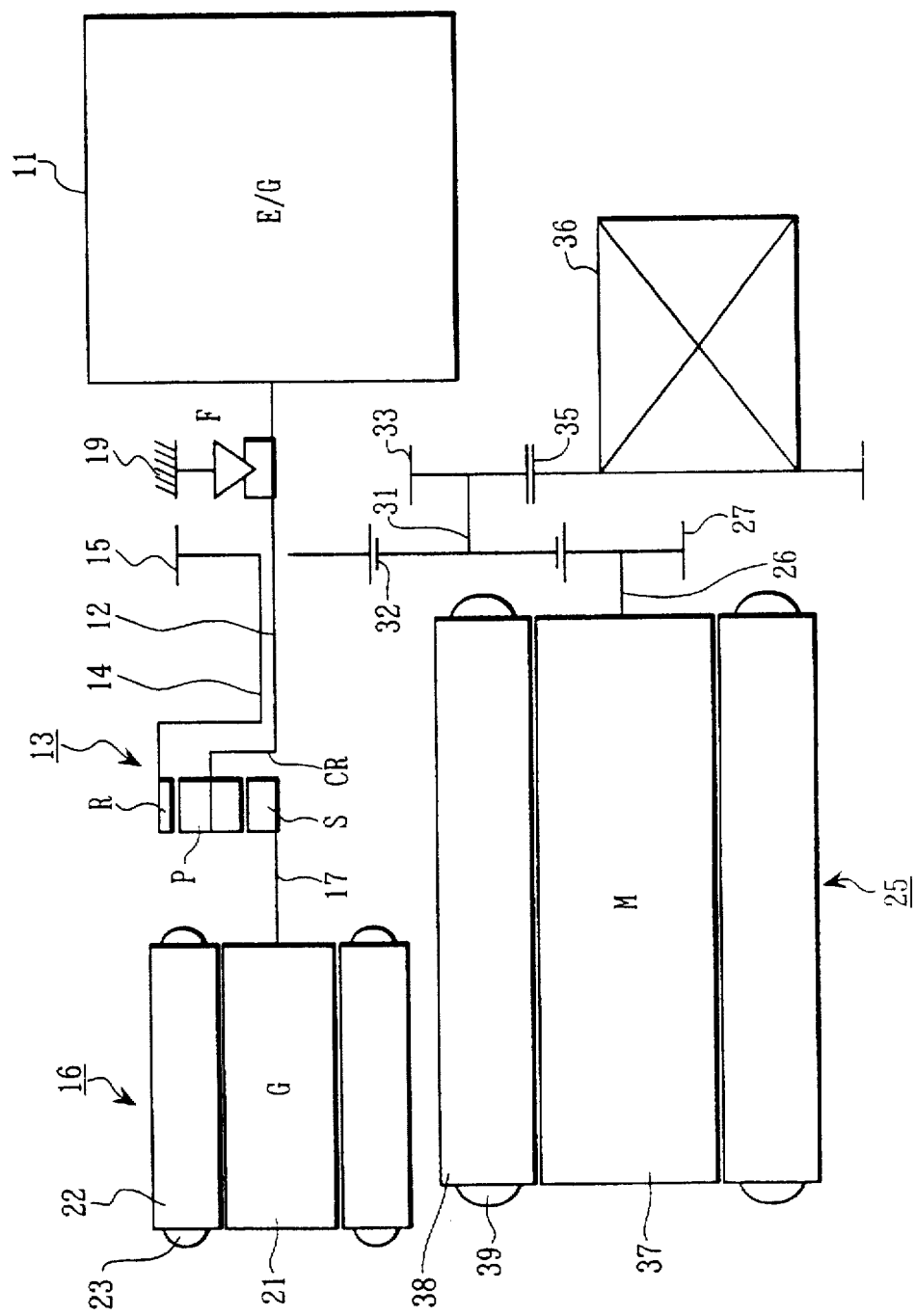
FIG. 2 is a schematic diagram of the drive system of the hybrid vehicle in the first embodiment of the present invention.

FIG. 2 shows the first embodiment of the present invention as including an internal-combustion engine (E/G) which is connected to a cooling unit such as a radiator or the like (not illustrated) for release of heat generated in the internal-combustion engine 11. An output shaft 12 receives rotation from the internal-combustion engine 11 and a planetary gear unit 13 functions as a differential gear system for changing the speed of the rotation input through the output shaft 12. An output shaft 14 receives and outputs the rotation at the speed which has been established in the planetary gear unit 13. A first counter drive gear 15 is fixed to the output shaft 14 and a generator/motor (G) 16, serving as an electric machine, is connected to the planetary gear unit 13 through a transmission shaft 17.

A one-way clutch F, serving as a control means, is positioned between the output shaft 12 and a casing 19. The one-way clutch F becomes free when the internal-combustion engine 11 rotates in its normal direction, and locks when the output shaft 12 rotates the internal-combustion engine 11 in a reverse direction.

The output shaft 14 is formed as a sleeve surrounding the output shaft 12. The first counter drive gear 15 is positioned closer to the internal-combustion engine 11 than the planetary gear unit 13.

The planetary gear unit 13 consists of a sun gear S as the first gear element, a pinion P engaged with the sun gear S, a ring gear R as the second gear element engaged with the pinion P, and a carrier CR as the third gear element rotatably supporting the pinion P.

The sun gear S is connected to the generator/motor 16 through the transmission shaft 17, and the ring gear R is connected to the first counter drive gear 15 through the output shaft 14, while the carrier CR is connected to the internal-combustion engine 11 through the output shaft 12.

The generator/motor 15 is fixed to the transmission shaft 17 and consists of a rotor 21, a stator 22 positioned around the rotor 21, and a coil 23 coiled around the stator 22. The generator/motor 16 generates electricity by use of the rotation transmitted through the transmission shaft 17. The coil 23 is connected to a battery (not illustrated), and electricity is supplied to and stored in the battery. The rotor 21 is provided with a brake (not illustrated) which is connected to the casing 19 and, by applying the brake, the rotor 21 can be stopped.

An electric motor (M) 25 outputs rotation through an output shaft 26 and a second counter drive gear 27 is fixed to the output shaft 26. The electric motor 25 is fixed to the output shaft 26 and consists of a rotor 37, a stator 38 positioned around the rotor 37, and a coil 39 coiled around the stator 38.

The electric motor 25 generates torque from the electric current supplied to the coil 39. Accordingly, the coil 39 is connected to and is supplied with electric current from the battery. When the hybrid vehicle decreases its speed, the electric motor 25 receives rotation from the driving wheels (not illustrated), thereby generating regenerative current which is supplied to and stored in the battery.

A counter shaft 31 is provided to rotate the driving wheels in the same direction as that in which the internal-combustion engine 11 rotates, and a counter driven gear 32 is fixed on the counter shaft 31. The counter driven gear 32 is engaged with the first counter drive gear 15 and with the second counter drive gear 27, so that the first counter drive gear 15 and the second counter drive gear 27 are reversely rotated and their rotation is transmitted to the counter driven gear 32.

A dif-pinion gear 33 having a smaller number of gear teeth than the counter driven gear 32 is fixed on the counter shaft 31.

A dif-ring gear 35 is engaged with the dif-pinion gear 33. A differential unit 36 is fixed to the dif-ring gear 35, and the rotation transmitted to the dif-ring gear 35 is differentiated by the differential unit 36 and transmitted to the driving wheels.

As described above, not only the rotation generated by the internal-combustion engine 11, but also the rotation generated by the electric motor 25 can be transmitted to the counter driven gear 32. Therefore, the hybrid vehicle can be driven in an engine driving mode in which only the internal-combustion engine 11 is driven, in a motor driving mode in which only the electric motor 25 is driven, or in an engine-motor driving mode in which both the internal-combustion engine 11 and electric motor 25 are driven.

By controlling the generator/motor 16, the rotation of the above-described transmission shaft 17 is controlled, and the internal-combustion engine 11 and the electric motor 25 can both be driven at their maximum efficiency.

Figure 3:
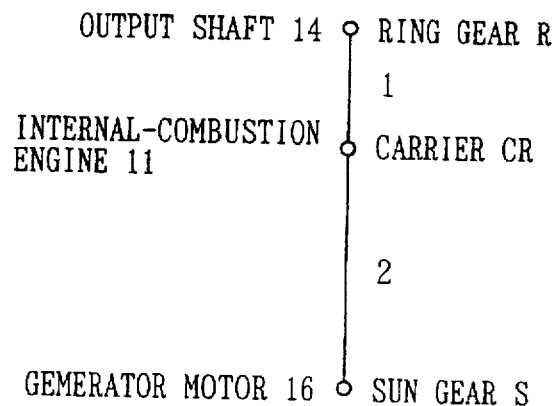
FIG. 3 is a conceptional diagram of the planetary gear unit of the first embodiment of the present invention.
Figure 4:
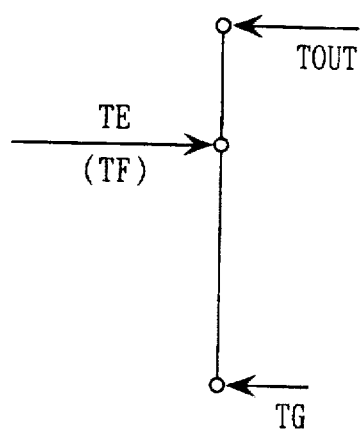
FIG. 4 is a torque diagram for normal driving of the vehicle of the first embodiment of the present invention.

In this embodiment, the number of teeth of the ring gear R of the planetary gear unit 13 (FIG. 2) is twice as many as that of the sun gear S (FIG. 3). Accordingly, as illustrated in FIG. 4, when the torque output to the output shaft 14 (hereinafter referred to as "output torque") is TOUT, the torque of the internal-combustion engine 11 (hereinafter referred to as "engine torque") is TE, and the torque of the generator/motor 16 (hereinafter referred to as "generator/motor torque") is TG, $$TE:TOUT:TG=3:2:1$$

and TE, TOUT, and TG respectively receive a reaction force from one another.

Since the one way clutch F prevents the output shaft 12 from rotating the internal-combustion engine 11 in a reverse direction, the internal-combustion engine 11 is stopped and no engine torque TE is generated. When no engine torque TE is generated, the reaction force of the generator/motor torque TG can be received by the one way clutch F whereby torque TF is generated by the one way clutch F.

Figure 5:
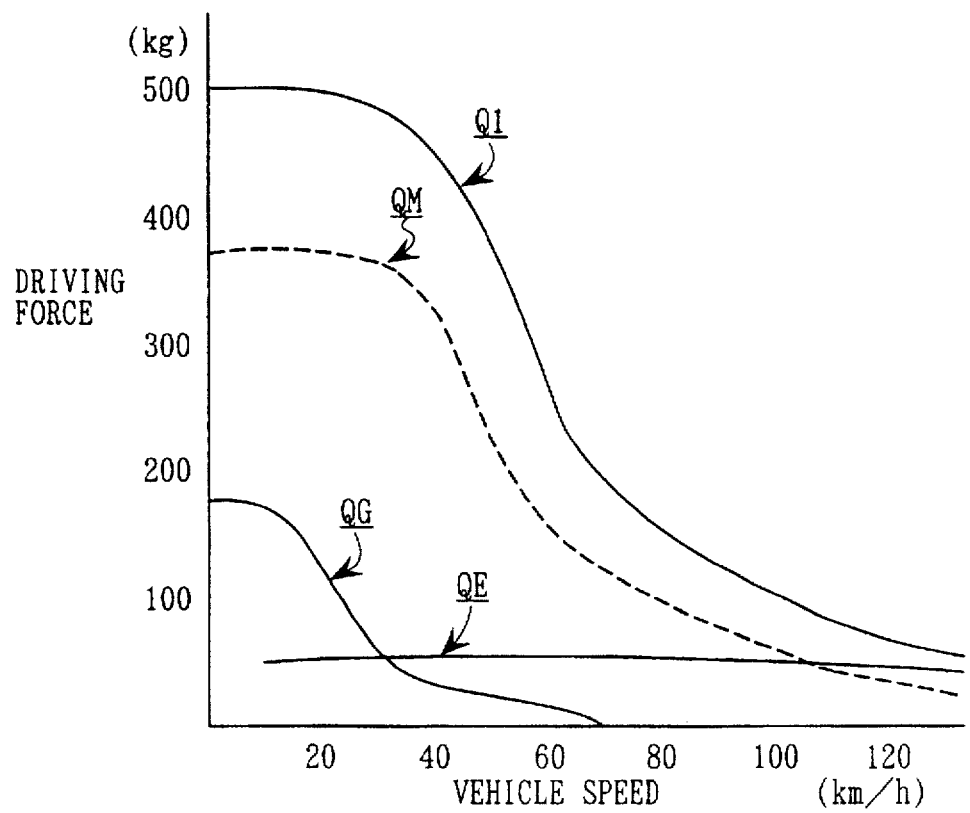
FIG. 5 is a graph of the relationship between the vehicle speed and the driving force in the first embodiment of the present invention.

FIG. 5 is a graph of the relationship between the vehicle speed V (abscissa) and the driving force Q (ordinate) in the first embodiment of the present invention. The driving force of the hybrid vehicle Q can be represented by:

$$Q = Tw \cdot r/R$$

wherein the torque is Tw, the gear ratio is r, and the radius of the tire of the driving wheel is R.

When the driving force required for driving the hybrid vehicle (hereinafter referred to as "required driving force") is Q1, the driving force of the electric motor 25 (FIG. 2) is QM, the driving force of the generator/motor 16 is QG, and the driving force of the internal-combustion engine 11 is QE, the driving force QM is smaller than the required driving force Q1; therefore, the driving force QM alone is insufficient to drive the hybrid vehicle. Thus, a deficiency in the driving force must be compensated for by the internal-combustion engine 11 or the generator/motor 16, and generally the lower the vehicle speed V becomes, the larger the driving force QG of the generator/motor 16 becomes. For example, when the vehicle speed V is lower than 30 km/h, the driving force QG of the generator/motor 16 is larger than the driving force QE of the internal-combustion engine 11.

Accordingly, in this embodiment, when the vehicle speed V is less than 30 km/h, the internal-combustion engine 11 is stopped and the deficiency in the driving force QM is compensated for by the driving force QG of the generator/motor 16. When the vehicle speed V is more than 30 km/h, the deficiency in the driving force QM is compensated for by the driving force QE of the internal-combustion engine 11.

In this way, the driving force QM of the electric motor 25 can be small in a low speed region. Accordingly, the torque constant of the electric motor 25 need not be larger than that required for such a small driving force QM.

When the internal-combustion engine 11 is stopped and the hybrid vehicle is driven in a motor driving mode, the efficiency of the hybrid vehicle generally becomes low in the region in which the load on the electric motor 25 is light (hereinafter referred to as "light load region"). Accordingly, the hybrid vehicle is driven by the driving force QG of the generator/motor 16 in a light load region with the vehicle speed V less than 30 km/h, and is driven by the driving force QM of the electric motor 25 in a heavy load region.

In the block diagram of FIG. 1, 11 is the internal-combustion engine, 16 is the generator/motor, and 25 is the electric motor. 41 are driving wheels, 43 is a battery, and 44 is an allowable charge capacity detecting device detecting the allowable charge capacity of the battery 43. The above-described allowable charge capacity is detected as battery voltage, battery residual charge amount, battery temperature, and so on.

An engine control device 46 controls the internal-combustion engine 11 to provide either a driving state or a non-driving state, a generator/motor control device controls the generator/motor 16, and a motor control device 49 controls the electric motor 25. It should be noted that the internal-combustion engine 11 can be put in a non-driving state by turning off an ignition switch (not illustrated), or by making the degree of the throttle opening 0.

A CPU (ECU) 51 serves as a control system for controlling the entire hybrid vehicle, and the CPU 51 receives, as input signals, the amount of pressure applied to the accelerator pedal 52 (hereinafter referred to as the "degree of the accelerator opening") α, detected by a load detecting means (not illustrated), and the vehicle speed V detected by a vehicle speed detecting means 10. Responsive to these input signals, the CPU 51 controls the engine control device 46, the generator/motor control device 47, and the motor control device 49.

Figure 6:
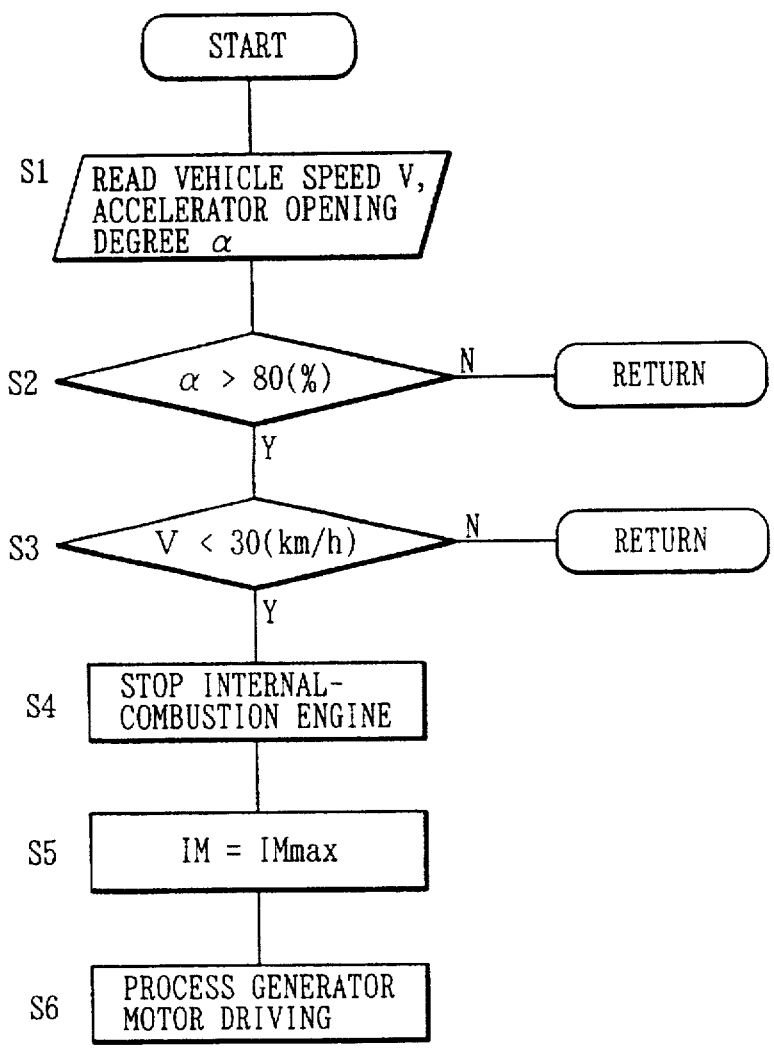
FIG. 6 is a flow chart of a control routine employed in the first embodiment of the present invention.

In the control routine of FIG. 6, utilized in the first embodiment:

Step S1: CPU 51 (FIG. 1) reads the detected vehicle speed V and the degree of the accelerator opening α.

Step S2: CPU 51 then determines whether or not the required driving force Q1 (FIG. 5) is large and at the same time, whether or not the degree of the accelerator opening α is more than 80%.

When the degree of the accelerator opening α is more than 80%, the routine proceeds to Step S3, and when the degree of the accelerator opening α is less than 80%, it returns.

Step S3: Whether or not the vehicle speed V is less than a set value, for example, 30 km/h is determined. When the vehicle speed V is less than 30 km/h, the routine proceeds to Step S4, and when the vehicle speed V is more than 30 km/h, returns.

Step S4: The internal-combustion engine 11 is stopped.

Step S5: The electric current IM supplied to the generator/motor 16 is raised to the maximum value IMmax.

Step S6: The generator/motor is controlled by the generator/motor control device 47 to compensate for a deficiency of the driving force QM of the electric motor 25.

Figure 7:
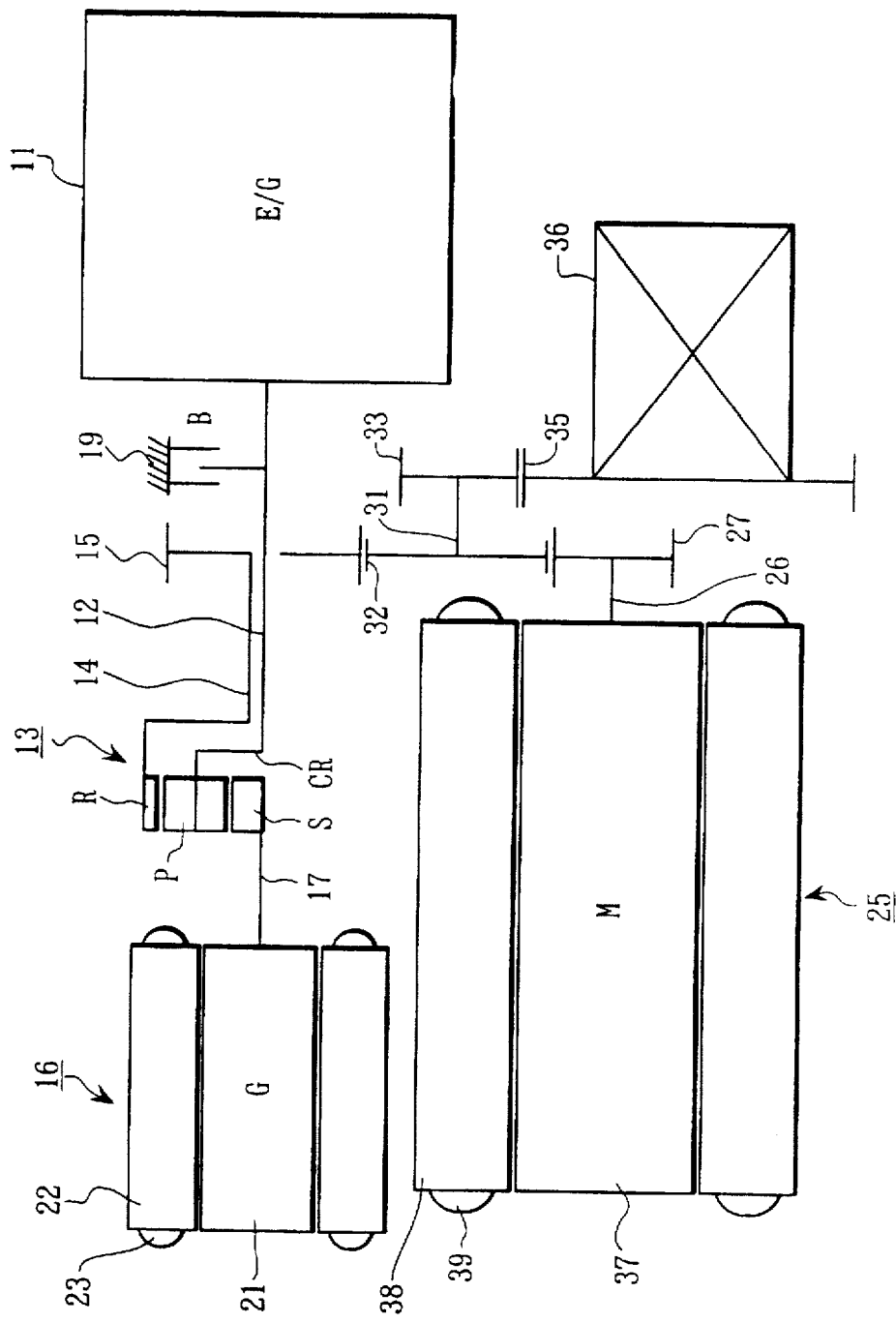
FIG. 7 is a schematic diagram of the drive system of the hybrid vehicle in a second embodiment of the present invention.

A second embodiment of the present invention will now be described with reference to FIG. 7. It should be noted that the description of the those elements which are the same as in the first embodiment are designated by identical symbols.

In the second embodiment, a brake B serves as a stopping means and is provided between the output shaft 12 and the casing 19. A brake control device (not illustrated), for applying and releasing the brake B, is connected to the CPU 51 (FIG. 1). When the degree of the accelerator opening α is more than 80% and the vehicle speed V is less than 30 km/h, the CPU 51 stops the internal-combustion engine 11, engages the brake B, and raises the electric current IM supplied to the electric motor 25 to the maximum value IMmax.

Figure 8:
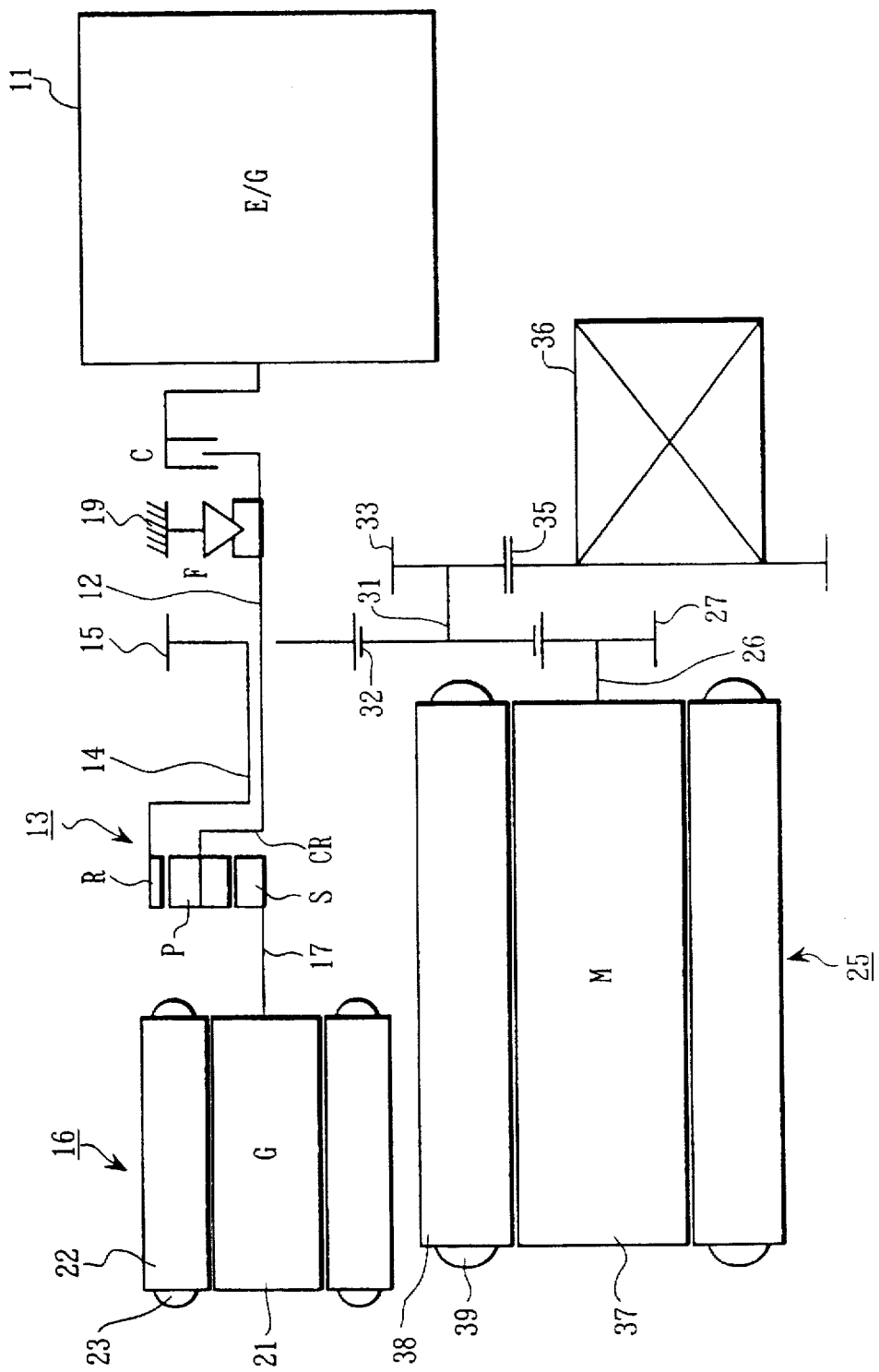
FIG. 8 is a schematic diagram of the drive system of the hybrid vehicle in a third embodiment of the present invention.

A third embodiment of the present invention will now be described with reference to FIG. 8. Again, those elements which are the same as in the first embodiment are designated by identical symbols.

In this third embodiment, a clutch C is provided between the internal-combustion engine 11 and the output shaft 12, and the one-way clutch F serves as a stopping means and is provided between the output shaft 12 and the casing 19. A clutch control device (not illustrated) is connected to the above-described CPU 51 (FIG. 1) in order to engage and release the above-described clutch C.

When the degree of the accelerator opening α is more than 80%, and the vehicle speed V is less than 30 km/h, the CPU 51 releases the clutch C and raises the electric current IM supplied to the electric motor 25 the maximum value IMmax. Any deficiency in the driving force QM of the electric motor 25 is compensated for by the driving force QG (FIG. 5) of the generator/motor 16, and during this time, the clutch C is released, so that there is no need to stop the internal-combustion engine 11.

Figure 9:
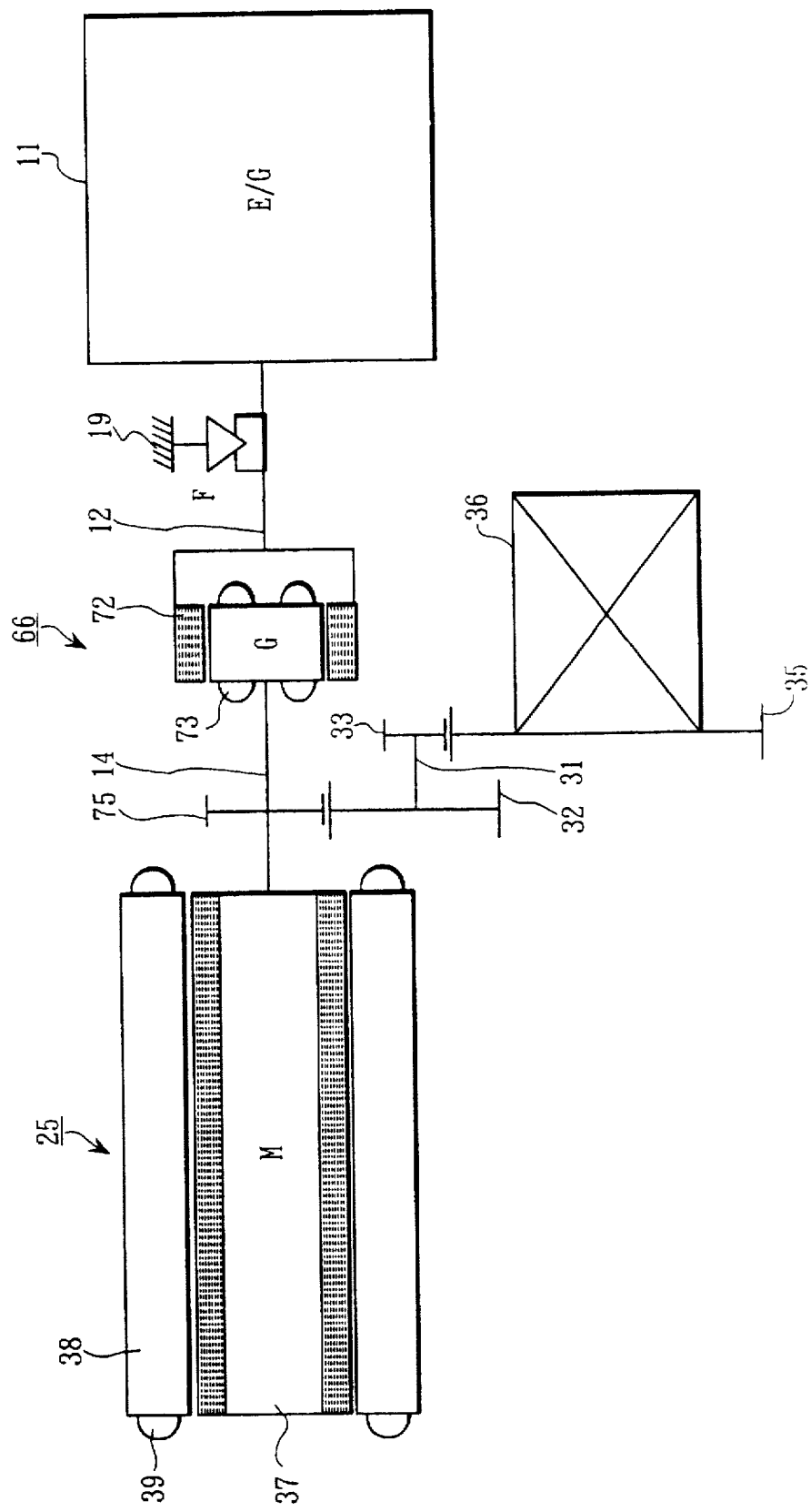
FIG. 9 is a schematic diagram of the drive system of the hybrid vehicle in a fourth embodiment of the present invention.

A fourth embodiment of the present invention will now be described with reference to FIG. 9. In FIG. 9, 11 is the internal-combustion engine, 12 is the output shaft, and a generator/motor 66, serving as an electric machine unit, is connected to the output shaft 12. The one-way clutch F, serving as a braking means, is provided between the output shaft 12 and the casing 19.

The generator/motor 66 consists of a rotor 71, a stator 72 which is rotatable and surrounds the rotor 71, and a coil 73 coiled around the stator 72. The generator/motor 66 generates electric power by the rotation transmitted through the output shaft 12. The coil 73 is connected to the battery 43 (FIG. 1), and the generated electric current is supplied to and stored in the battery 43.

25 is the electric motor. 14 is the output shaft to which the rotation of the electric motor 25 is output, and 75 is a counter drive gear fixed on the output shaft 14. The electric motor 25 is fixed on the output shaft 14, and consists of the rotor 37, the stator 38 which is arranged around the rotor 37, and the coil 39 coiled around the stator 38.

The electric motor 25 generates torque by the electric current supplied to the coil 39. Therefore the coil 39 is connected to the battery 43 and electric current is supplied from the battery 43. When the hybrid vehicle is decreasing in speed, the electric motor 25 receives the rotation from the driving wheels 41 and generates regenerative electric current, which is supplied to and stored in the battery 43.

The counter shaft 31 rotates the driving wheels 41 in the same direction as the rotation of the internal-combustion engine 11, and the counter driven gear 32 is fixed on the counter shaft 31. The dif-pinion gear 33, having a smaller number of teeth than that of the counter driven gear 32, is fixed on the counter shaft 31.

The dif-ring gear 35 is engaged in the dif-pinion gear 33. The dif-ring gear 35 is fixed to the differential unit 36 and its rotation is differentiated by the differential unit 36 and transmitted to the driving wheels 41.

The one-way clutch F becomes free when the internal-combustion engine 11 rotates in its normal direction, and the one-way clutch F locks when the output shaft 12 causes the internal-combustion engine 11 to rotate in a reverse direction.

When the internal-combustion engine 11 is stopped, any deficiency in the driving force QM of the electric motor 25 can be compensated for by the driving force QG of the generator/motor 66.

As has been described above, in the present invention, the hybrid vehicle includes the internal-combustion engine, the electric machine unit to which the rotation from the internal-combustion engine is input, the electric motor driven by electric current supplied thereto, the differential gear unit consisting of at least three gear elements, with the first gear element being connected to the electric machine unit, the second gear element being connected to the output shaft, and the third gear element being connected to the internal-combustion engine, and the mechanical stopping means which stops the rotation of the third gear element. In this case, the third gear element generates reaction force by the mechanical stopping means. Then the electric machine unit previously used as a generator can be used as a motor. As a result, the driving force can be added to the running torque of the hybrid vehicle, so that the driving force of the electric motor can be reduced to that required of the electric machine unit.

Accordingly, the torque constant of the electric motor can be made as small as that required to provide the driving force of the electric machine unit, so that running with heavy load can be realized without making the electric motor large and without requiring inverter elements of large capacity.

Other embodiments of the hybrid vehicle of the present invention include an internal-combustion engine, an electric machine unit in which both the stator and the rotor are rotatable and in which the rotation from the internal-combustion engine is input to the stator, an electric motor which is connected to the rotor of the electric machine unit and which is driven by the electric current supplied thereto, and stopping means which is provided between the internal-combustion engine and the electric machine unit to stop the rotation of the above-described stator.

What is claimed is:

1. A hybrid vehicle comprising:
   an internal-combustion engine;
   a generator/motor for generating electric power from input rotation;
   an electric motor driven by an electric current supplied thereto;
   an output shaft connected to said internal-combustion engine and said electric motor;
   a differential gear unit having at least three gear elements, including a first gear element connected to said generator, a second gear element connected to said output shaft, and a third gear element connected to said engine; and
   stopping means for stopping rotation of said third gear element, so that output torque from said generator/motor is transmitted to said output shaft as a result of said stopping means functioning as a reaction force element when said generator/motor operates as a motor.

2. A hybrid vehicle according to claim 1, further comprising vehicle speed detecting means for detecting vehicle speed, and wherein said internal-combustion engine is stopped and said generator is driven when the vehicle speed detected by said vehicle speed detecting means is lower than a set value.

3. A hybrid vehicle according to claim 2, further comprising load detecting means for detecting a required running load, and wherein said internal-combustion engine is stopped and said generator is driven when the required load detected by said load detecting means is larger than a set value and at the same time the vehicle speed detected by said vehicle speed detecting means is lower than a set value.

4. A hybrid vehicle according to claim 3, wherein said required running load is a load on said electric motor.

5. A hybrid vehicle according to claim 3, wherein said required running load is detected as a degree of accelerator opening.

6. A hybrid vehicle according to claim 1, wherein said stopping means is a one-way clutch.

7. A hybrid vehicle according to claim 6, wherein said one-way clutch becomes free when said internal-combustion engine rotates in a normal direction, and said one-way clutch locks to prevent said internal-combustion engine from rotation in a reverse direction.

8. A hybrid vehicle according to claim 1, wherein a clutch is provided between said internal-combustion engine and said stopping means.

9. A hybrid vehicle according to claim 1, wherein said stopping means includes a friction element.

10. A hybrid vehicle according to claim 1 wherein said stopping means is located between said differential gear unit and said engine.

11. A hybrid vehicle according to claim 1 wherein said stopping means is located between said generator/motor and said engine.

12. A hybrid vehicle, comprising:
   an internal-combustion engine;
   an electric motor driven by an electric current supplied thereto;

an output shaft connected to said electric motor;

a generator including an armature and a rotor, both of which are rotatable, one of said armature and said rotor being connected to said output shaft and the other of said armature and said rotor being connected to said internal-combustion engine; and stopping means, provided between said internal-combustion engine and said generator/motor, for stopping rotation of a shaft connected to said engine when said generator/motor operates as a motor and transmits rotation to the output shaft.

13. A hybrid vehicle according to claim 12, further comprising vehicle speed detecting means for detecting vehicle speed, and wherein said internal combustion engine is stopped and said generator is driven when the vehicle speed detected by said vehicle speed detecting means is lower than a set value.

14. A hybrid vehicle according to claim 13, further comprising load detecting means for detecting a required running load, and wherein said internal combustion engine is stopped and said generator is driven when the required load detected by said load detecting means is greater than a set value and at the same time the vehicle speed detected by said vehicle speed detecting means is lower than a set value.

15. A hybrid vehicle according to claim 14, wherein said required running load is a load on said electric motor.

16. A hybrid vehicle according to claim 14, wherein said required running load is detected as a degree of accelerator opening.

17. A hybrid vehicle according to claim 2, wherein said stopping means is a one-way clutch.

18. A hybrid vehicle according to claim 17, wherein said one-way clutch becomes free when said internal-combustion engine rotates in a normal direction and said one-way clutch locks to prevent said internal-combustion engine from rotation in a reverse direction.

19. A hybrid vehicle according to claim 12, wherein a clutch is provided between said internal-combustion engine and said stopping means.

20. A hybrid vehicle according to claim 12, wherein said stopping means includes a friction element.

* * * * *